US010795420B2

(12) United States Patent
Wilhelmi et al.

(10) Patent No.: US 10,795,420 B2
(45) Date of Patent: *Oct. 6, 2020

(54) OFFLINE BATTERY MANAGEMENT IN A DEVICE

(71) Applicant: Microsoft Technology Licensing, LLC, Redmond, WA (US)

(72) Inventors: Ceceli Ann Wilhelmi, Seattle, WA (US); Ricardo Marquez, Bellevue, WA (US); Ying Huang, Sammamish, WA (US); Wei Guo, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 39 days.

This patent is subject to a terminal disclaimer.

(21) Appl. No.: 16/022,643

(22) Filed: Jun. 28, 2018

(65) Prior Publication Data

US 2018/0321723 A1  Nov. 8, 2018

Related U.S. Application Data

(63) Continuation of application No. 14/734,757, filed on Jun. 9, 2015, now Pat. No. 10,031,567.

(51) Int. Cl.
*G06F 1/26* (2006.01)
*H02J 9/06* (2006.01)
(Continued)

(52) U.S. Cl.
CPC .............. *G06F 1/263* (2013.01); *G06F 1/30* (2013.01); *H02J 7/007* (2013.01); *H02J 7/0068* (2013.01); *H02J 9/06* (2013.01)

(58) Field of Classification Search
CPC .......... G06F 1/263; G06F 1/30; H02J 7/0068; H02J 7/007; H02J 9/06
See application file for complete search history.

(56) References Cited

U.S. PATENT DOCUMENTS 5,557,738 A    9/1996  Townsley et al.
6,392,383 B1 *  5/2002  Takimoto .............. G06F 1/1632
                                                    320/115

(Continued)

OTHER PUBLICATIONS

"Office Action Issued in European Patent Application No. 16729657.3", dated Sep. 2, 2019, 5 pages.
(Continued)

*Primary Examiner* — Chad G Erdman
(74) *Attorney, Agent, or Firm* — Rainier Patents, P.S.

(57) ABSTRACT

Techniques are described for battery management in a computing device. The described techniques may be implemented by a battery offline module that provides functionality to control utilization of a battery such as determining whether the battery is available to receive power from a power source. For instance, the battery offline module may receive an input requesting that a battery be taken offline, determine whether system conditions for taking the battery offline are met, and take the battery offline when the system conditions are met such that the battery is not capable of receiving power from a power source of the computing device. In some instances, the battery offline module may cause different powering and charging arrangements between multiple batteries of the computing device. By implementing the battery offline module in the computing device, battery utilization is controlled to improve battery life.

20 Claims, 7 Drawing Sheets

(51) Int. Cl.
    *H02J 7/00*         (2006.01)
    *G06F 1/30*        (2006.01)

(56)             References Cited

U.S. PATENT DOCUMENTS

| | | | |
|---|---|---|---|
| 7,002,265 B2* | 2/2006 | Potega | H02J 7/00036<br>307/149 |
| 2002/0006750 A1* | 1/2002 | Hidesawa | G06F 1/1616<br>439/625 |
| 2008/0074080 A1* | 3/2008 | Luo | G06F 1/263<br>320/132 |
| 2013/0221904 A1* | 8/2013 | Kang | H02J 7/0022<br>320/107 |
| 2014/0059360 A1* | 2/2014 | Guthrie | G06F 1/30<br>713/300 |
| 2015/0153810 A1* | 6/2015 | Sasidharan | G06F 1/3212<br>713/320 |
| 2016/0149428 A1* | 5/2016 | Nunami | G06F 1/1632<br>320/136 |
| 2017/0126044 A1* | 5/2017 | Xu | H02J 7/00 |

OTHER PUBLICATIONS

"Office Action and Search Report Issued in Chinese Patent Application No. 201680033616.6", dated Nov. 5, 2019, 14 pages.

* cited by examiner

OFFLINE BATTERY MANAGEMENT IN A DEVICE

RELATED APPLICATION

This application is a continuation of and claims priority to U.S. patent application Ser. No. 14/734,757, filed Jun. 9, 2015, entitled "Offline Battery Management in a Device", the entire disclosure of which is hereby incorporated by reference herein in its entirety.

BACKGROUND

Mobile computing devices have been developed to increase the functionality that is made available to users in a mobile setting. For example, a user may interact with a mobile phone, tablet computer, or other mobile computing device to check email, surf the web, compose texts, interact with applications, and so on.

One challenge that faces developers of mobile computing devices is battery life. As functionality that is made available via mobile computing devices increases so too does the amount of power consumed by this functionality. For example, processors having increased processing power, display devices that are larger and have increased number of pixels, and as such consume ever increasing amounts of power. However, conventional battery and power management techniques may limit availability of this functionality due to limitations on an amount of power that may be made available.

SUMMARY

Techniques for battery management in a computing device are described. The described techniques may be implemented by a battery offline module that provides functionality to control utilization of a battery such as determining whether the battery is available to receive power from a power source. For instance, the battery offline module may receive an input requesting that a battery be taken offline, determine whether system conditions for taking the battery offline are met, and take the battery offline when the system conditions are met such that the battery is not capable of receiving power from a power source of the computing device. In some instances, the battery offline module may cause different powering and charging arrangements between multiple batteries of the computing device. By implementing the battery offline module in the computing device, battery utilization is controlled to improve battery life.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
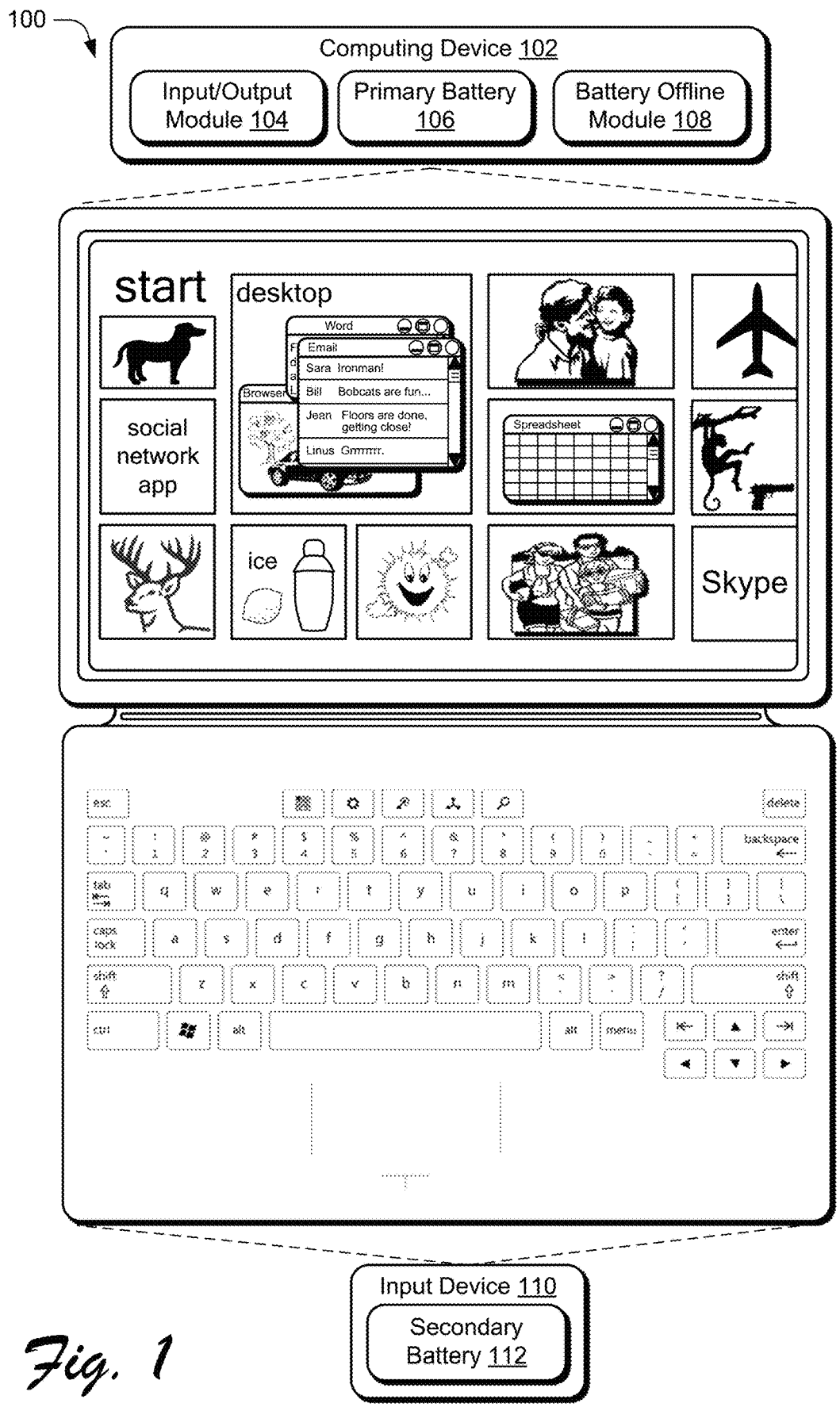
FIG. 1 is an illustration of an environment in an example implementation that is operable to control utilization of a primary and/or secondary battery.

Mobile computing devices have been developed to increase the functionality that is made available to users in a mobile setting. For example, a user may interact with a mobile phone, tablet computer, or other mobile computing device to check email, surf the web, compose texts, interact with applications, and so on.

One challenge that faces developers of mobile computing devices is battery life. As functionality that is made available via mobile computing devices increases so too does the amount of power consumed by this functionality. For example, processors having increased processing power, display devices that are larger and have increased number of pixels, and so on consume ever increasing amounts of power. However, conventional battery and power management techniques may limit availability of this functionality due to limitations on an amount of power that may be made available.

Techniques for battery management in a computing device are described. The described techniques may be implemented by a battery offline module that provides functionality to control utilization of a battery such as determining whether the battery is available to receive power from a power source. For instance, the battery offline module may receive an input requesting that a battery be taken offline, determine whether system conditions for taking the battery offline are met, and take the battery offline when the system conditions are met such that the battery is not capable of receiving power from a power source of the computing device. In some instances, the battery offline module may cause different powering and charging arrangements between multiple batteries of the computing device. By implementing the battery offline module in the computing device, battery utilization is controlled to improve battery life.

Functionality provided by the battery offline module causes charging and/or discharging of a battery thereby ensuring that the battery provides improved battery life when selected to power the computing device. In one example implementation, the battery offline module is configured to control whether the battery is available to receive power from charge/discharge control circuitry responsive to an input requesting that the battery be taken offline and a determination of whether one or more system conditions (e.g., thermal and powers conditions) of a computing device have been met for taking the battery offline.

The battery offline module may cause the battery to go offline responsive to the input after determining that the system conditions have been met. When the system conditions of the computing device are not met, the input requesting that the battery be taken offline will be ignored by the computing device such that the battery remains either online or offline as the case may be prior to the battery offline module receiving the input. Thus, the battery offline module controls battery utilization to improve battery life by determining the appropriate times to connect and/or disconnect the battery to charge/discharge control circuitry.

In another example implementation, the battery offline module is configured to switch a battery from an offline state in which the battery is not available to receive power from charge/discharge control circuitry to an online state in which the battery is available to receive power from the charge/discharge control circuitry responsive to a determination that at least one input has not been received from an system embedded controller (EC) for at least a predefined amount of time. In this example, the EC is responsible for sending periodic inputs that operate to switch the battery between the offline and online states. Failing to receive an input from the EC for the pre-defined amount of time may be a result of system problems that prevent the EC from generating or sending an input. Regardless of the reason for failing to receive an input, the battery offline module outputs a default input that controls an operating state of a battery offline switch. In this way, a battery that would remain in an offline state due to failing to receive an input instead returns to an online state.

The battery offline module may cause different powering and charging arrangements between multiple batteries of a computing device. The battery offline module may be implemented, for instance, to arrange the multiple batteries according to a level of charging current available, a state of charge of each of the batteries, differences in charge cycles, current and anticipated load conditions, and so forth.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ the techniques described herein. The illustrated environment 100 includes a computing device 102, which may be configured in a variety of ways.

For example, a computing device may be configured as a computer that is capable of communicating over a network, such as a desktop computer, a mobile station, an entertainment appliance, a set-top box communicatively coupled to a display device, a wireless phone, a game console, and so forth. Thus, the computing device 102 may range from full resource devices with substantial memory and processor resources (e.g., personal computers, game consoles) to a low-resource device with limited memory and/or processing resources (e.g., traditional set-top boxes, hand-held game consoles). Additionally, although a single computing device 102 is shown, the computing device 102 may be representative of a plurality of different devices, such as multiple servers utilized by a business to perform operations such as by a web service, a remote control and set-top box combination, an image capture device and a game console configured to capture gestures, and so on.

The computing device 102 is illustrated as including a variety of hardware components, examples of which include an input/output module 104, a primary battery 106, a battery offline module 108, and an input device 110 that includes a secondary battery 112. Although illustrated separately, functionality of these components may be further divided, combined (e.g., on an application specific integrated circuit), and so forth.

The input/output module 104 is representative of functionality to send and/or receive inputs to and/or from an operating system of the computing device 102. For instance, the input/output module is responsible for generating an input requesting that the primary battery 106 to be in an online or offline state. Here, the input may be representative of a hardware signal. As will be discussed in more detail below, the generated input represents a request to operate a battery in either an online or offline state.

The computing device 102 is further illustrated as including primary battery 106 and secondary battery 112 which are representative of various different kinds of battery cells that may be included with the computing device including Super or Ultra Capacitor's, fuel cells, NiMH, NiCd, Pb & Lithium Chemistry battery packs. Each of primary battery 106 and secondary battery 112 may include multiple batteries of the same type as well as include batteries having different characteristics such as different sizes/capacities, cycle counts, chemistries, battery technologies, shapes, state of charge (SOC), charge rates, discharge rates, impedance, and so forth. Accordingly, each of the primary and secondary batteries may include a diverse combination of multiple battery cells at least some of which may have different characteristics one to another. Various combinations of primary battery 106 and secondary battery 112 may be utilized to provide a range of capacities, performance capabilities, efficiencies, and power usage characteristics that may be mapped to different end usage scenarios.

The battery offline module 108 included in computing device 102 provides functionality to control utilization of the primary battery 106 and/or the secondary battery 112. In one or more implementations, the battery offline module 108 receives an input requesting that the primary battery 106 be taken offline from the input/output module 104. Responsive to receiving the input, the battery offline module 108 determines whether system conditions for taking the primary battery 106 offline are met. If the system conditions are met, the battery offline module 108 takes the primary battery 106 offline. In one specific example, the battery offline module 108 may cause the computing device 102 to receive power from the secondary battery 112 sufficient to operate the computing device 102. Thus, the primary and secondary batteries of the computing device 102 may be operating in an online or offline state as directed by the battery offline module 102. Further discussion of these and other aspects will be discussed below.

Functionality provided by the battery offline module 108 may include failsafe functionality involving determination that at least one input from the input/output module 104 has not been received from a system embedded controller (EC)

for at least a predefined amount of time. Responsive to this determination, the battery offline module 108 outputs a signal to switch the primary battery 106 from an offline state in which the primary battery 106 is not available to receive power from charge/discharge control circuitry to an online state in which the primary battery 106 is available to receive power from the charge/discharge control circuitry. In this way, the techniques may be employed to offline the primary battery 106 that is included within a housing of the computing device 102 that includes the input/output module 104, display device, and so on.

FIG. 1 further illustrates input device 110 which represents functionality to receive user inputs. As illustrated, the secondary battery 112 is included in the input device 110 although in other examples the secondary battery 112 is included in similar portions of the computing device 102 as the primary battery 106, e.g., within the illustrated housing. The input device 110 is configured for removal from the computing device 102. Hence, when the input device 110 is detached, the secondary battery 112 will also be detached. In this scenario, the computing device may operate using the primary battery 106 or supplied power. By using the techniques implemented by the battery offline module 108, the primary battery 106 is charged and/or discharged to provide improved battery life when needed, e.g., when "away" from the secondary battery 112 as further described below.

Figure 2:
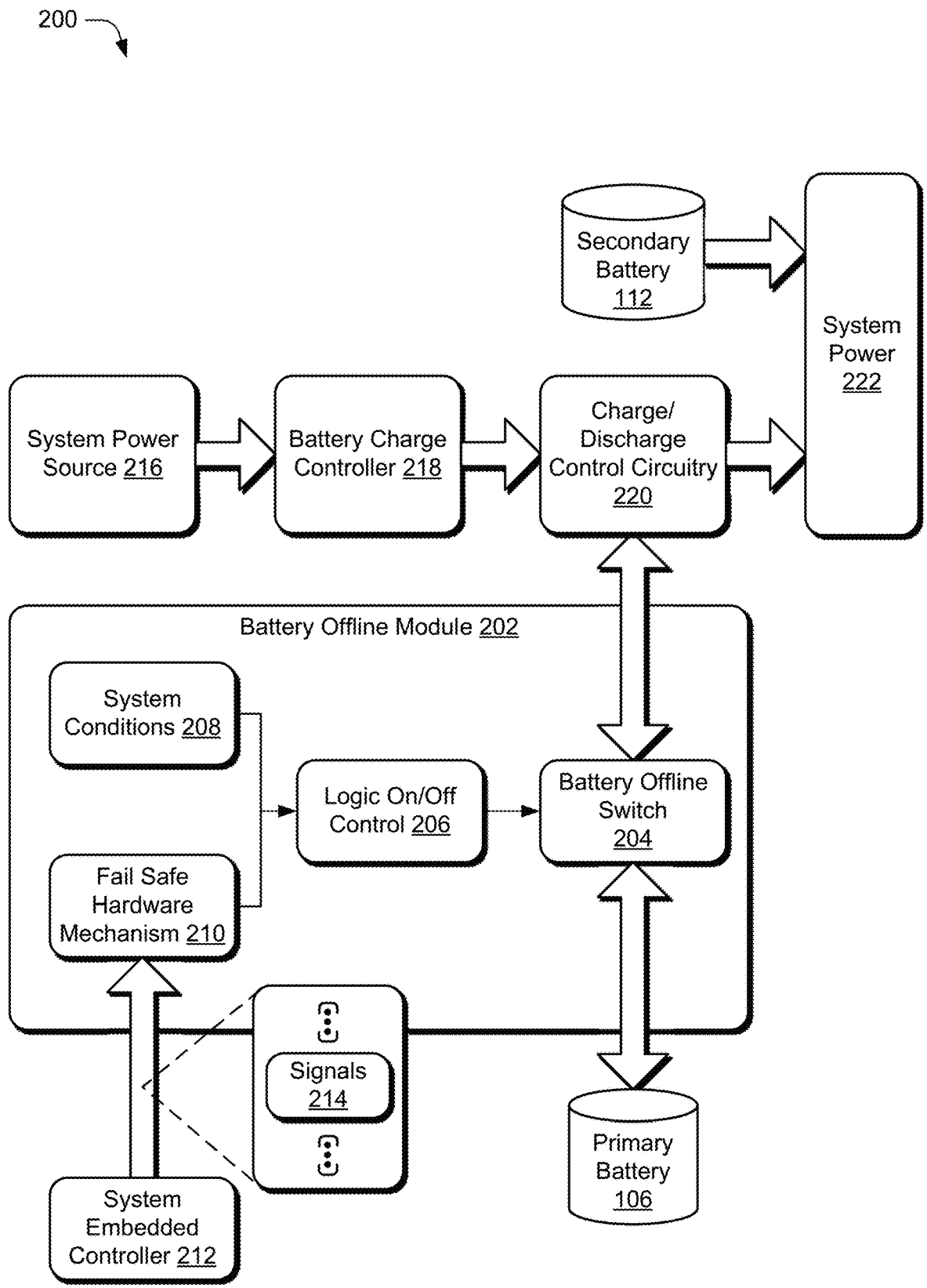
FIG. 2 is an illustration of a system in an example implementation showing the battery offline module of FIG. 1 in greater detail.

FIG. 2 is an illustration of a system 200 in an example implementation showing the battery offline module of FIG. 1 in greater detail. As represented in FIG. 2, battery offline module 202 includes battery offline switch 204, logic on/off control 206, system conditions 208, and fail safe hardware mechanism 210. Also represented in FIG. 2 are system embedded controller 212 (EC), signals 214, system power source 216, battery charge controller 218, charge/discharge control circuitry 220, and system power 222.

The battery offline module 202 implements functionality to control primary battery 106 and/or secondary battery 112 in a variety of ways. For instance, the battery offline module 202 may connect and disconnect the primary battery 106 to charge/discharge control circuitry 220 via the battery offline switch 204. The battery offline switch 204 provides switching mechanisms to distribute current to the primary battery 106 for charging and/or distribute current from the primary battery 106 to service a load. The battery offline switch 204 may be configured using various logic, hardware, circuitry, firmware, and/or software suitable to connect the primary battery 106 to system power source 216 for charging or to disconnect the primary battery 106 from the system power source 216 to provide the system power 222. Thus, the battery offline switch 204 may be implemented to provide various functionality related to management of both charging of the primary battery 106 and delivery of power from the primary battery 106 to service a system load coupled to the system power 222.

The battery offline switch 204 is coupled between the primary battery 106 and charge/discharge control circuitry 220. By locating the battery offline switch 204 directly between the charge/discharge control circuitry 220 and the primary battery 106, utilization of the primary battery 106 is controlled as described herein. In one example the battery offline switch 204 is configured as a transistor, one specific example of which includes a P-Channel metal-oxide-semiconductor field-effect transistor (MOSFET). In one or more implementations, the battery offline switch 204 is configured to receive instructions from the logic on/off control 206 as will be discussed in further detail below.

The logic on/off control 206 represents fixed logic circuitry, firmware, and/or other hardware based logic that is configured to control the battery offline switch 204 for charging and discharging the primary battery 106. In one or more implementations, the logic on/off control 206 is configured to receive an input from the fail safe hardware mechanism 210, qualify the input for output based on system conditions 208 received as another input of the logic on/off control 206, and output an instruction that controls the battery offline switch 204. In one particular implementation, the logic on/off control 206 is configured as an 'AND' hardware gate.

The fail safe hardware mechanism 210 implements functionality to control the primary battery 106 by sending a signal to the logic on/off control 206. Functionality of the fail safe hardware mechanism 210 may be provided using any suitable combination of hardware, software, firmware, and/or logic devices to receive, analyze, generate, and/or output signals. In one or more implementations, the fail safe hardware mechanism 210 is configured to receive signals 214 from the EC 212. These signals 214 operate as instructions that indicate "when' to operate a battery between online and/or offline states. In one specific example, signals 214 are sent from the EC 212 to failsafe hardware mechanism 210 after an operating system determines that the primary battery 106 is to be online or offline.

Generally, the EC 212 is responsible for sending signals 214 that operate to switch the battery between the offline and online states. In some scenarios, this may include sending signals at a periodic rate. In other words, multiple periodic signals may be sent at regular intervals from the EC 212 thereby enabling the fail safe hardware mechanism 210 to identify when an input was not received at an expected time frame.

The EC 212 runs firmware which can potentially lockup or otherwise be unable to send signals 214. As defined herein, lockup may refer to conditions caused by the computing device being in a hung or frozen state. This lockup may be but one cause of the circumstance described earlier in which at least one input has not been received at the fail safe hardware mechanism 210. Compared to typical systems that fail to manage a battery during a lockup, the fail safe hardware mechanism 210 is configured to identify that a signal was not received during the predefined amount of time, and in response generate a default output that serves as the input to the logic on/off control 206.

The default output serves to operate the battery offline switch 204 responsive to being qualified by the system conditions at the logic on/off control 206. In other words, when system conditions 208 are met, the logic on/off control 206 enables the output from the fail safe hardware mechanism 210 to reach the battery offline switch 204. Alternatively, when the system conditions 208 are not met, the logic on/off control 206 disables the output from the fail safe hardware mechanism 210 from reaching the battery offline switch 204.

System conditions 208 represent system feedback describing operating conditions of a computing device. System conditions may be in the form of hardware signals issued from specific systems that detect thermal and power conditions of the computing device. For instance, specific systems providing feedback may include thermal, power supply, primary and secondary battery, power level comparators, to name a few. Further, the system conditions may be based on battery characteristics such as capacity, type of battery, thermal properties, detected cycle count imbalance between batteries, and so forth.

System 200 as represented in FIG. 2 further includes system power source 216, battery charge controller 218, charge/discharge control circuitry 220, and system power 222. These elements generally represent an example power structure found in typical computing devices. The system power source 216 may be any source of power that serves to support operation of a computing device. Battery charge controller 218 operates to control output from the system power source 216 to a charge/discharge control circuitry 220. The battery charge controller is depicted as being connected to system power source 216 from which charging current may be obtained to charge the primary battery 106. To perform the charging, the battery charge controller 218 may implement a control policy that determines control of the charge/discharge control circuitry 220. As depicted, the charge/discharge control circuitry 220 facilitates power arrangements that provide system current from the system power source 216, the primary battery 106, and/or the secondary battery 112.

Figure 3:
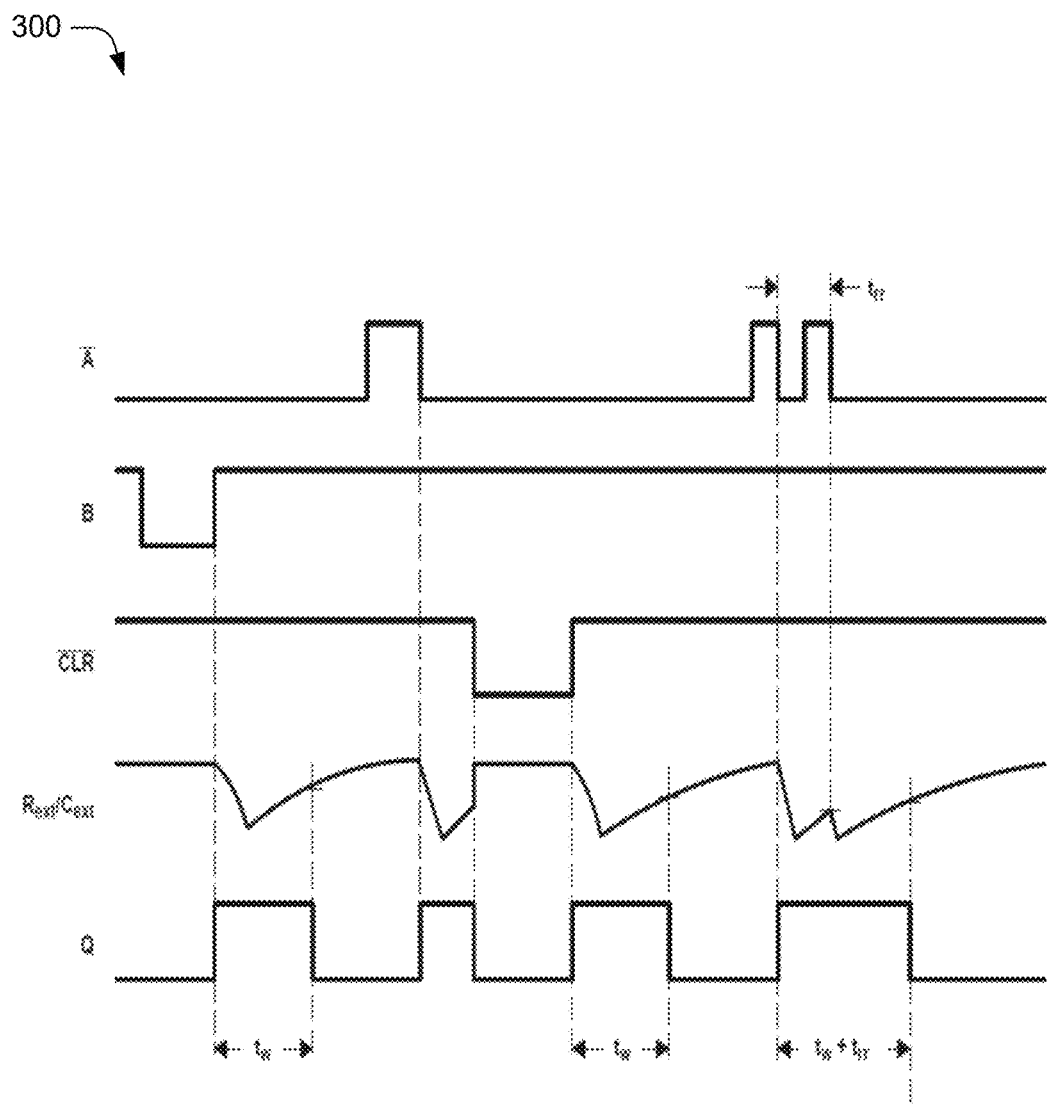
FIG. 3 is an illustration of an example input/output timing diagram for the fail safe hardware mechanism included in the battery offline module of FIG. 2.

FIG. 3 is an illustration of an example input/output timing diagram 300 for the fail safe hardware mechanism 210 included in the battery offline module 202 of FIG. 2. As illustrated, inputs $\overline{A}$ and B control output Q according to the values of external timing resistance (Rext) and external timing capacitance (Cext). For instance, a pulse duration $t_w$ is determined based at least in part on Rext and Cext. In one specific example, input $\overline{A}$ may be representative of the signals 214 in FIG. 2. That is, input $\overline{A}$ may be representative of a request or instruction indicating 'when' to operate a battery between online and/or offline states. Input B represents an input voltage and input $\overline{CLR}$ represents a clear signal that serves to reset an internal watchdog timer (not shown) associated with the fail safe hardware mechanism 210. Output Q from the fail safe hardware mechanism 210 may serve as an input to the logic on/off switch control 206 as described above, or alternatively may be sent directly to the battery offline switch 204.

To achieve the input/output timing, the fail safe hardware mechanism may be configured in various ways. In one implementation, the fail safe hardware mechanism includes a one shot circuit that is configured to identify that at least one input has not been received from the system embedded controller for at least a predefined amount of time. The fail safe hardware mechanism may further include hardware components such as a voltage comparator and logic circuitry. In one or more implementations, the fail safe hardware mechanism receives a pulse and outputs a pulse based at least in part on a voltage associated with the received pulse. Output of the fail safe hardware mechanism may be according to the table included in FIG. 3. Example logic values for input/output are shown though it should be apparent that other values may be used in other implementations.

Example Procedures

The following discussion describes battery management techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the figures described above.

Functionality, features, and concepts described in relation to the examples of FIGS. 1-3 may be employed in the context of the procedures described herein. Further, functionality, features, and concepts described in relation to different procedures below may be interchanged among the different procedures and are not limited to implementation in the context of an individual procedure. Moreover, blocks associated with different representative procedures and corresponding figures herein may be applied together and/or combined in different ways. Thus, individual functionality, features, and concepts described in relation to different example environments, devices, components, and procedures herein may be used in any suitable combinations and are not limited to the particular combinations represented by the enumerated examples.

Figure 4:
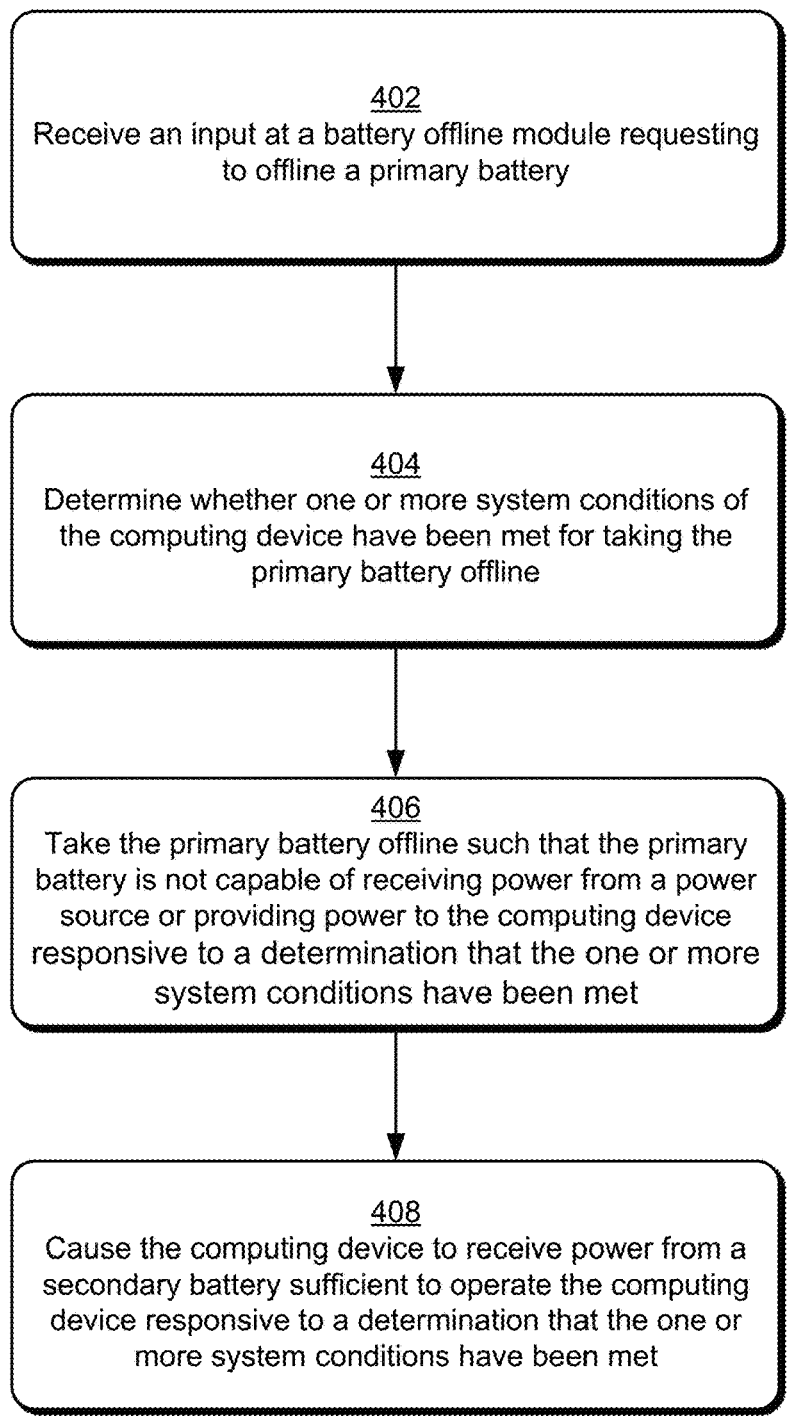
FIG. 4 is a flow diagram depicting a procedure in an example implementation in which the battery offline module controls utilization of a primary and secondary battery.

FIG. 4 is a flow diagram depicting a procedure 400 in an example implementation in which the battery offline module controls utilization of a primary and secondary battery. In at least some implementations, procedure 400 may be performed by a suitably configured computing device such as computing device 102 of FIG. 1 having a battery offline module 108 or as described in relation to FIG. 7.

An input is received at a battery offline module (block 402). For instance, the battery offline module 108 may receive an input requesting that primary battery 106 of the computing device 102 be taken offline such that the primary battery 106 is not capable of receiving power from a power source of the computing device 102. The primary battery 106, for instance, may be configured to be non-removable from within a housing of the computing device (e.g., a tablet, mobile phone, and so on) without the use of tools.

A determination is made as to whether one or more system conditions of the computing device have been met for taking the primary battery offline (block 404). For instance, the battery offline module 108 may use system conditions 208 to determine whether the received input is 'qualified' to take the battery offline.

The primary battery is taken offline such that the primary battery is not capable of receiving power from a power source or providing power to the computing device responsive to a determination that the one or more system conditions have been met (block 406). For instance, the battery offline module 108 may control battery offline switch 204 to take the primary battery 106 offline.

In response to a determination that the one or more system conditions have been met, the computing device is caused to receive power from a secondary battery sufficient to operate the computing device (block 408). For instance, the battery offline module 108 may cause the secondary battery 112 to provide current sufficient to operate the computing device 102. In one specific example, the causing is responsive to the battery offline module 108 taking the primary battery 106 offline.

Figure 5:
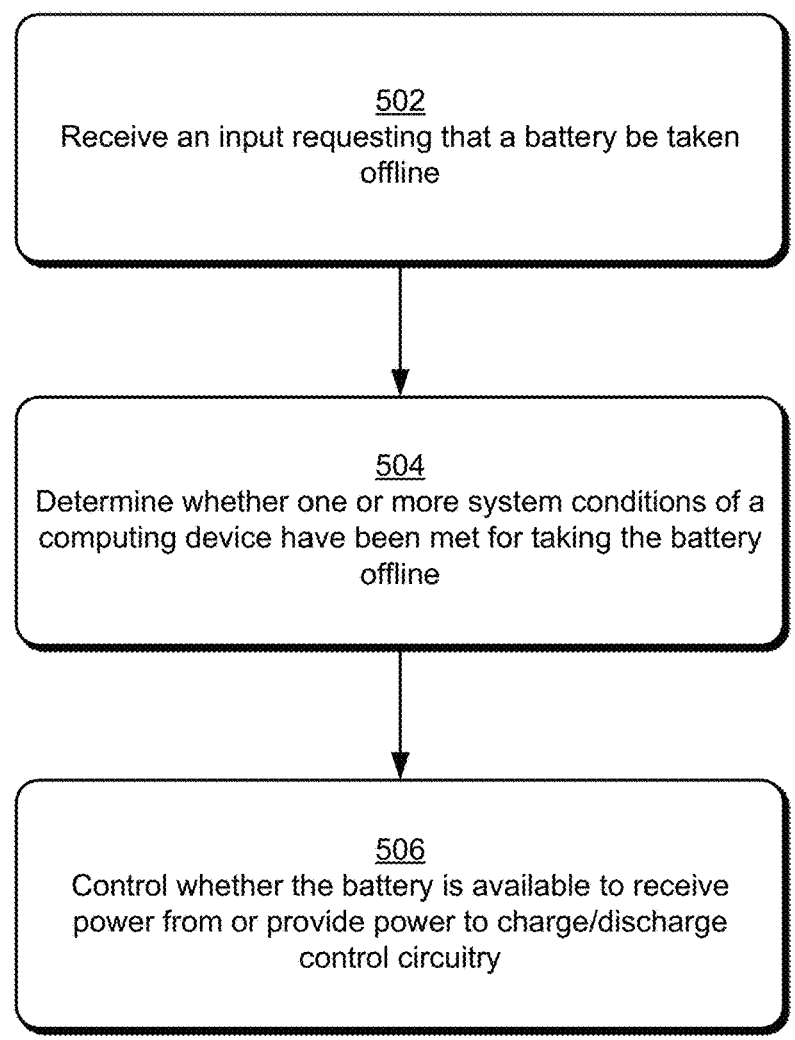
FIG. 5 is a flow diagram depicting a procedure in an example implementation in which the battery offline module controls whether a battery is available to receive power from charge/discharge control circuitry.

Having considered an example implementation in which the battery offline module controls utilization of a primary and secondary battery, consider now a procedure 500 in FIG. 5 that depicts an example implementation in which the battery offline module controls whether a battery is available to receive power from charge/discharge control circuitry. In at least some implementations, procedure 500 may be performed by a suitably configured computing device such as computing device 102 of FIG. 1 having a battery offline module 108 or as described in relation to FIG. 7.

An input requesting that a battery be taken offline is received (block 502). For instance, the battery offline module 108 may receive an input requesting that a battery of the computing device 102 be taken offline.

A determination is made as to whether one or more system conditions of the computing device have been met for taking the battery offline (block 504). For instance, the battery offline module 108 may use system conditions 208 and logic circuitry to determine whether the received input is 'qualified' to take the battery offline. In one example, the system conditions are based at least in part on a state of a secondary battery of the computing device.

Availability of the battery to receive power from or provide power to charge/discharge control circuitry is controlled (block 506). For instance, the battery offline module 108 controls the battery via a switch, such as battery offline switch 204. Signals and/or inputs that control the battery offline switch 204 cause the battery to either connect or disconnect to charge/discharge control circuitry, such as charge/discharge control circuitry 220.

Figure 6:
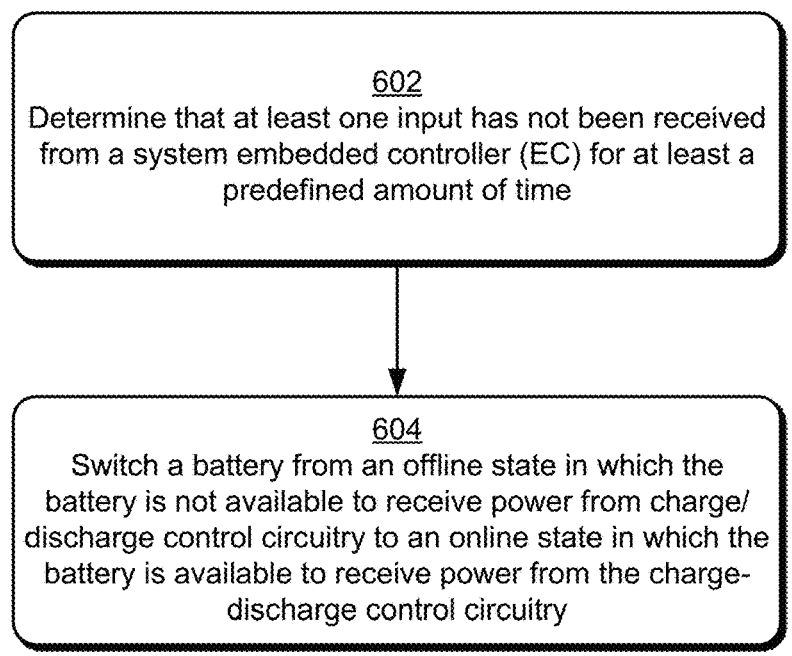
FIG. 6 is a flow diagram depicting a procedure in an example implementation in which the battery offline module switches a battery from an offline state to an online state.

FIG. 6 is a flow diagram depicting a procedure 600 in an example implementation in which the battery offline module switches a battery from an offline state to an online state. In at least some implementations, procedure 600 may be performed by a suitably configured computing device such as computing device 102 of FIG. 1 having a battery offline module 108 or as described in relation to FIG. 7.

A determination that at least one input has not been received from a system embedded controller (EC) for at least a predefined amount of time is made (block 602). For instance, the battery offline module 108 may determine that the at least one input has not been received. In one specific example, this determination is made via the fail safe hardware mechanism 210. Responsive to this determination, a battery is switched from an offline state in which the battery is not available to receive power from charge/discharge control circuitry to an online state in which the battery is available to receive power from the charge-discharge control circuitry (block 604).

Example System and Device

Figure 7:
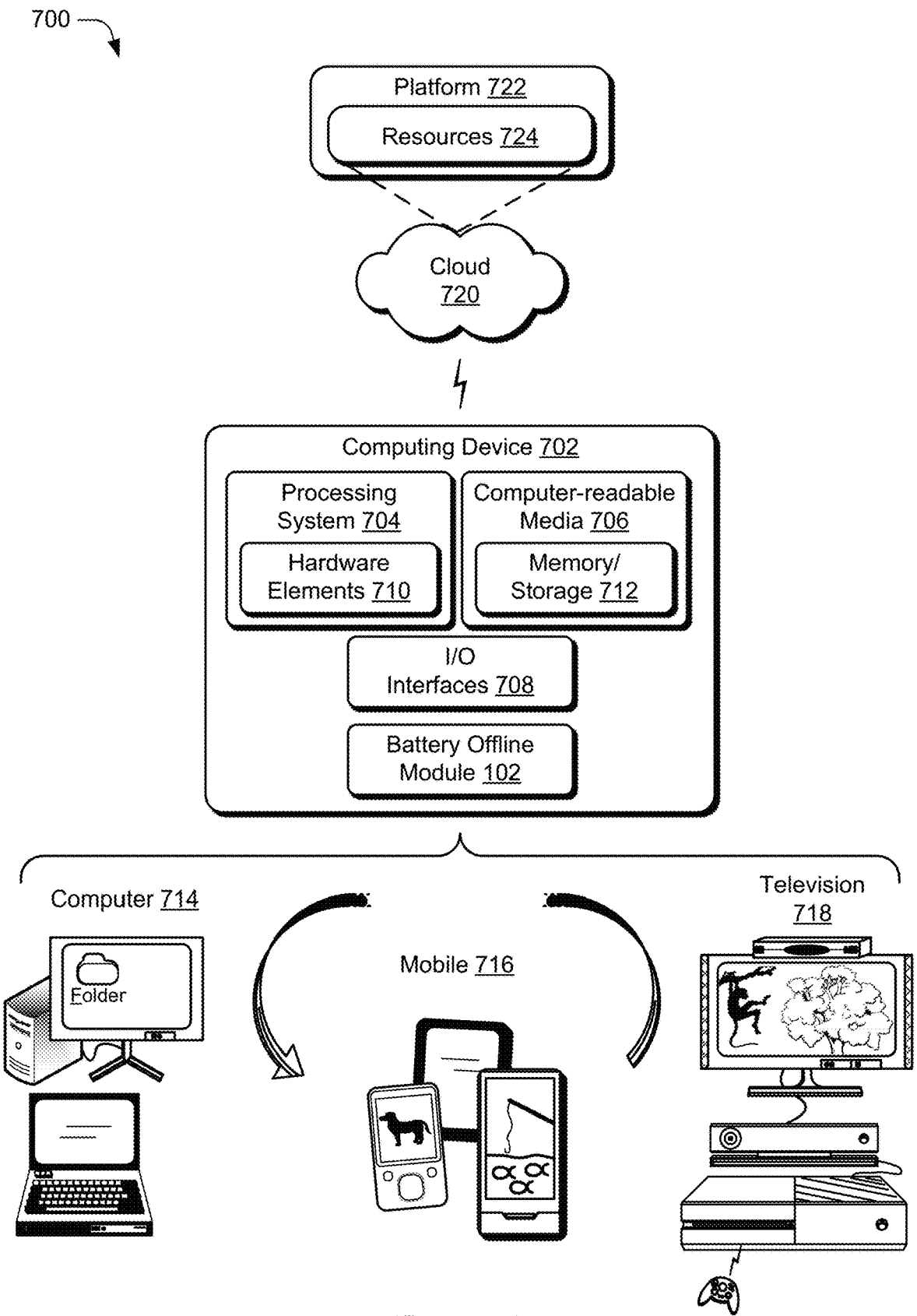
FIG. 7 illustrates an example system including various components of an example device that can be implemented as any type of computing device as described with reference to FIGS. 1 and 2 to implement embodiments of the techniques described herein.

FIG. 7 illustrates an example system generally at 700 that includes an example computing device 702 that is representative of one or more computing systems and/or devices that may implement the various techniques described herein. This is illustrated through inclusion of the battery offline module 102. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interface 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware element 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

As further illustrated in FIG. 7, the example system 700 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 700, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 702 may assume a variety of different configurations, such as for computer 714, mobile 716, and television 718 uses. Each of these configurations includes devices that may have generally different constructs and capabilities, and thus the computing device 702 may be configured according to one or more of the different device classes. For instance, the computing device 702 may be implemented as the computer 714 class of a device that includes a personal computer, desktop computer, a multi-screen computer, laptop computer, netbook, and so on.

The computing device 702 may also be implemented as the mobile 716 class of device that includes mobile devices, such as a mobile phone, wearables (e.g., wrist bands, pendants, rings, etc.) portable music player, portable gaming device, a tablet computer, a multi-screen computer, and so on. The computing device 702 may also be implemented as the television 718 class of device that includes devices having or connected to generally larger screens in casual viewing environments. These devices include televisions, set-top boxes, gaming consoles, and so on. Other devices are also contemplated, such as appliances, thermostats and so on as part of the "Internet of Things."

The techniques described herein may be supported by these various configurations of the computing device 702 and are not limited to the specific examples of the techniques described herein. This functionality may also be implemented all or in part through use of a distributed system, such as over a "cloud" 720 via a platform 722 as described below.

The cloud 720 includes and/or is representative of a platform 722 for resources 724. The platform 722 abstracts underlying functionality of hardware (e.g., servers) and software resources of the cloud 720. The resources 724 may include applications and/or data that can be utilized while computer processing is executed on servers that are remote from the computing device 702. Resources 724 can also include services provided over the Internet and/or through a subscriber network, such as a cellular or Wi-Fi network.

The platform 722 may abstract resources and functions to connect the computing device 702 with other computing devices. The platform 722 may also serve to abstract scaling of resources to provide a corresponding level of scale to encountered demand for the resources 724 that are implemented via the platform 722. Accordingly, in an interconnected device embodiment, implementation of functionality described herein may be distributed throughout the system 700. For example, the functionality may be implemented in part on the computing device 702 as well as via the platform 722 that abstracts the functionality of the cloud 720.

CONCLUSION AND EXAMPLE IMPLEMENTATIONS

Example implementations described herein include, but are not limited to, one or any combinations of one or more of the following examples:

In one or more examples, a method includes

A method as described alone or in combination with any of the above or below examples, Although the example implementations have been described in language specific to structural features and/or methodological acts, it is to be understood that the implementations defined in the appended claims is not necessarily limited to the specific features or acts described. Rather, the specific features and acts are disclosed as example forms of implementing the claimed features.

What is claimed is:

1. A computing device comprising:
    a first battery;
    a detachable second battery;
    a power source other than the first battery and the detachable second battery; and
    at least a memory and a processor configured to perform operations comprising:
    causing the computing device to receive power from the first battery sufficient to operate the computing device;
    receiving an input requesting that the first battery be taken offline;
    determining one or more conditions relating to the detachable second battery;
    in at least one instance, based at least on the one or more conditions:
        taking the first battery offline to prevent the first battery from being charged by the power source other than the first battery and the detachable second battery; and
        causing the computing device to receive power from the detachable second battery sufficient to operate the computing device.

2. The computing device of claim 1, wherein the input requesting that the first battery be taken offline is generated by an operating system of the computing device.

3. The computing device of claim 1, wherein the first battery is taken offline such that the first battery is not capable of providing power to the computing device.

4. The computing device of claim 1, wherein the first battery is permanently installed in the computing device.

5. The computing device of claim 1, wherein the computing device comprises a housing having a display device, and the first battery is installed in the housing.

6. The computing device of claim 5, wherein the detachable second battery is provided in an input device that is detachable from the computing device.

7. The computing device of claim 6, wherein the determining the one or more conditions relating to the detachable second battery comprises detecting whether the input device is attached to the computing device.

8. The computing device of claim 7, wherein the operations further comprise:
    detecting a detachment of the input device from the computing device; and
    responsive to detecting the detachment of the input device, placing the first battery in an online state where the first battery is chargeable by the power source and can provide power to operate the computing device.

9. The computing device of claim 1, wherein the one or more conditions relate to at least one of a state or an availability of the detachable second battery.

10. The computing device of claim 1, wherein the operations further comprise controlling utilization of the first battery and the detachable second battery.

11. A computer-implemented method comprising:
    causing a computing device to receive power from a first battery sufficient to operate the computing device;
    receiving an input requesting that the first battery be taken offline;
    determining whether a detachable second battery is able to provide power sufficient to operate the computing device;
    responsive to determining that the detachable second battery is able to provide power sufficient to operate the computing device:
        taking the first battery offline in a manner that prevents charging of the first battery by a power source of the computing device other than the first battery and the detachable second battery; and
        causing the computing device to receive power from the detachable second battery or the power source sufficient to operate the computing device.

12. The computer-implemented method of claim 11, wherein the input requesting that the first battery be taken offline is generated by an operating system of the computing device.

13. The computer-implemented method of claim 11, wherein the first battery is taken offline such that the first battery is not capable of providing power to the computing device.

14. The computer-implemented method of claim 11, wherein the detachable second battery is provided in an input device, and determining whether the detachable second battery is able to provide power sufficient to operate the computing device comprises determining whether the input device is attached to the computing device.

15. The computer-implemented method of claim 14, further comprising:
    detecting a detachment of the input device from the computing device; and
    responsive to detecting the detachment of the input device, placing the first battery in an online state where the first battery is chargeable by the power source and can provide power to operate the computing device.

16. A computing device comprising:
    a non-removable first battery;
    a system power source other than the non-removable first battery and a detachable second battery;
    a switch configured to distribute charging current from the system power source to the non-removable first battery; and
    logic configured to:
        cause the computing device to receive power from the non-removable first battery sufficient to operate the computing device;
        receive an input requesting that the non-removable first battery be taken offline;
        detect one or more conditions relating to the detachable second battery when attached to the computing device; and
        in at least one instance, based at least on the one or more conditions:
            change a state of the switch to prevent the non-removable first battery from being charged by the system power source other than the non-removable first battery and the detachable second battery; and cause the computing device to receive power from the detachable second battery sufficient to operate the computing device.

17. The computing device of claim 16, wherein the logic comprises fixed logic circuitry.

18. The computing device of claim 16, wherein the logic comprises firmware.

19. The computing device of claim 16, wherein the detachable second battery is provided in an input device, and the logic is configured to detect attachment of the detachable second battery when the input device is attached to the computing device.

20. The computing device of claim 19, further comprising the input device having the detachable second battery provided therein.

* * * * *